United States Patent [19]

Naruse et al.

[11] Patent Number: 4,989,244

[45] Date of Patent: Jan. 29, 1991

[54] DATA ENCRIPTING TRANSFER

[75] Inventors: Yoshihiro Naruse; Hideharu Kato, both of Ichikawa; Yoshifumi Iwata, Toyota, all of Japan

[73] Assignees: Aisin Seiki Kabushiki Kaisha, Kariya; Kabushiki Kaisha, Shinsangyokaihatsu, Tokyo, both of Japan

[21] Appl. No.: 330,382

[22] Filed: Mar. 29, 1989

[30] Foreign Application Priority Data

Mar. 29, 1988 [JP] Japan ................................ 63-075586
Mar. 29, 1988 [JP] Japan ................................ 63-075587

[51] Int. Cl.[5] .......................................... H04N 7/167
[52] U.S. Cl. ...................................... 380/20; 380/21; 380/23; 380/18; 380/51
[58] Field of Search ................... 380/18, 20, 21, 23, 380/51

[56] References Cited

U.S. PATENT DOCUMENTS

4,459,611  7/1984  Arai et al. ............................ 380/20
4,691,355  9/1987  Wirstrom ............................. 380/23
4,710,921 12/1987  Ishidoh et al. ....................... 380/20

Primary Examiner—Nelson Moskowitz
Assistant Examiner—David Cain
Attorney, Agent, or Firm—Sughrue, Mion, Zinn, Macpeak & Seas

[57] ABSTRACT

A data encripting transfer system includes a scanner for scanning an object to output an image signal, a data encripting device for encripting the image signal, and a data decoder for decoding the encripted image signal. The system further includes a card having the data encripting device and the data decoder, and a receiving device for receiving the card. The received card enables the data encripting device and the data decoder.

9 Claims, 13 Drawing Sheets

Encripting Circuit [b]

Key Circuit

Power Supply Circuit

DATA ENCRIPTING TRANSFER

FIELD OF THE INVENTION

The present invention relates to data encripting transfer, especially in an image signal transfer; a data encripting transfer encripts and encodes the scanning image signal.

BACKGROUND OF THE INVENTION

Presently, many information systems such as a facsimile or computer networks are available. These information systems are beginning to use a wireless communication link, and also a combination of wireless and lined communication is increasing. However, for security reasons, it is necessary that such information systems prevent an error transfer, a tap by someone or data falsification by an outsider. This kind of security system is usually not opened to the public, because of its purpose. One of the security systems has a process for scrambling access codes to computer programs to thereby prevent illicit entry into and control of the system. In this system, even though the access codes are encripted: however, it is possible to find a key to solve the encription.

SUMMARY OF THE INVENTION

Accordingly, one of the objects of the present invention is to produce a data encripting transfer which is highly secure.

Another object of the present invention is to produce a data encripting transfer which can select a higher security system, if necessary.

Further, one of the objects of the present invention is to produce a data encripting transfer which can control a higher security system of an addressee.

Yet another object of the present invention is to produce a data encripting transfer which can change the encripting key words easily.

To achieve the above objects, and in accordance with the principles of the invention as embodied and broadly described herein, a data encripting transfer comprises: a scanner means for scanning an object to output an image signal, a data encripting means for encripting the image signal in accordance with a predetermined key operation and a data decoder means for decoding the encripted image signal in accordance with a predetermined key operation. Also, a data encripting transfer has a disable means for disabling the data encripting means and the data decoder means. Further, a data encripting transfer has a key operation setting means for setting a predetermined key operation for the data decoder means, which is set in an addressee.

Also to achieve the above objects, a data encripting transfer has a card means which includes the data encripting means and the data encoder means, and a receiving means which receives the card means and enables the data encripting means and the data encoder means.

In accordance with the above-described data encripting transfer, the data encripting means encripts the scanned image signal in accordance with a predetermined key operation and the data decoder means decodes the encripted signal in accordance with a predetermined key operation. Therefore, an image signal is encripted into an encripted signal and the encripted signal cannot be decoded without the decoder means and the predetermined key operation. Thus, the security of data is maintained.

In accordance with the above-described data encripting transfer with the disable means for disabling the data encripting means and the data decoder means, the system can send or receive the image signal or the encripted signal by selecting whether the data encripting processing is disabled or not.

In accordance with the above-described data encripting transfer with the key operation setting means, a sender can send the predetermined key operation signal to cause an addressee system to set the predetermined key operation for the data decoder. Therefore, a sender can select the setting of the key operation for the decoder means of the addressee.

In accordance with the above-described data encripting transfer with the card means which includes the data encripting means and the data decoder means, and the card receiving means, if the card is received by the card receiving means, the image signal can be encripted into the encripted signal and the encripted signal can be decoded into the image signal. Therefore, it is easy to replace the encripting means and the decoder means by changing the card.

Also by changing the card, a sender can send the encripted image signal to a limited number of addressees (i.e., only those who have the same card).

BRIEF DESCRIPTION OF THE DRAWING

For a full understanding of the invention, the following detailed description should be read in conjunction with the drawings wherein.

DETAILED DESCRIPTION OF THE PREFERRED EMBODIMENT

In the following, preferred embodiments of the present invention will be described with reference to the drawings.

Figure 2:
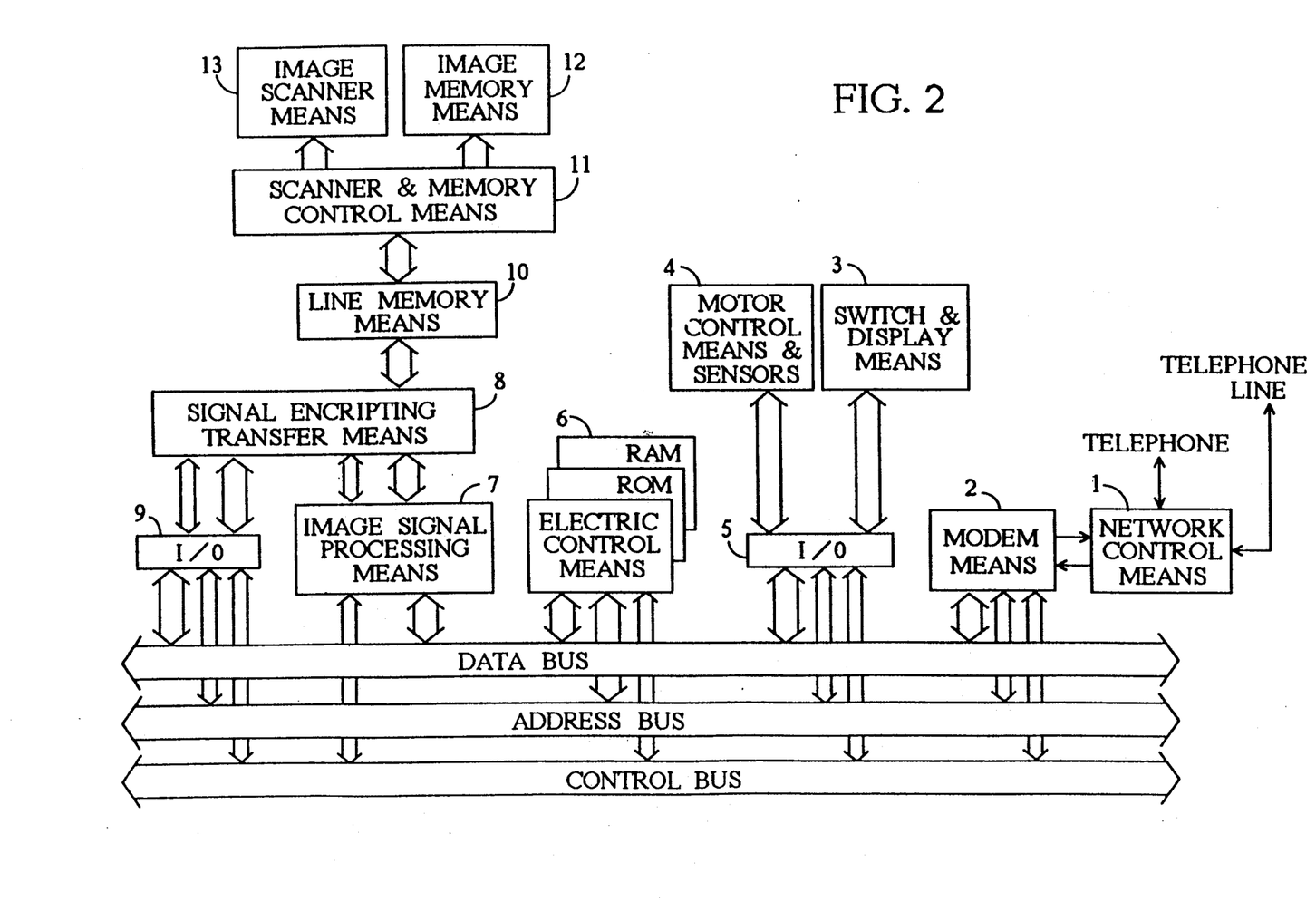
FIG. 2 is a circuit diagram of a facsimile which uses a data encripting transfer showing one embodiment of the present invention.

FIG. 2 is a circuit diagram showing a facsimile which uses a data encripting transfer of the present invention. Referring to FIG. 2, a network control means 1 which includes several control circuits and switches, changes a telephone line to a telephone or a facsimile. A telephone which is mounted on, for example, an automobile has a wireless transmitter and receiver. Always, a telephone is connected to a telephone line, and the network control means 1 changes a line to a facsimile when it receives a facsimile signal. A modem means 2 modulates and demodulates a digital signal by a carrier wave in voice frequency. Data bus, address bus and control buses are connected to the modem means 2. The network control means 1 and the modem means 2 are subject to change in accordance with a modulation mode. This facsimile further comprises the following. Switch and display means 3 switches and displays in accordance With a facsimile operation. Motor control means and sensors 4 control a pulse motor which feeds a thermal paper line by line. I/O 5 connects switch and display means 3 with motor control means and sensors 4 through the data bus, address bus and control bus. Electric control means 6 comprises a microprocessing unit MPU which controls the facsimile in accordance with a program which is memorized in ROM. The RAM is a read-write memory for a MPU's operation. Image signal processing means 7 expands a band width of the image signal of the modem 2 and outputs a line signal which has a predetermined paper width to the line memory means 10 through the signal encripting transfer means 8. Image signal processing means 7 compresses a band width of the output signal of the line memory means 11 through the signal encripting transfer means 8. Signal encripting transfer means 8 includes a data encripting means, data decoder means and disable means for disabling the data encripting means and data decoder means. The signal encripting transfer means 8 is connected to a data bus, an address bus and a control bus through the I/O 9. The line memory means 10 memorizes an image signal from the image signal processing means 7 and the signal encripting transfer means 8. The line memory means 10 outputs a memorized signal to the image memory means in a parallel signal and memorizes an image signal scanned by the image scanner means 13. The scanner and memory control means 11 writes an image signal of the line memory means 10 into the image memory means 12 which is a printer means or CRT display means and sends a scanned image signal by the image scanner means 13 to the line memory 11 line by line.

Figure 1:
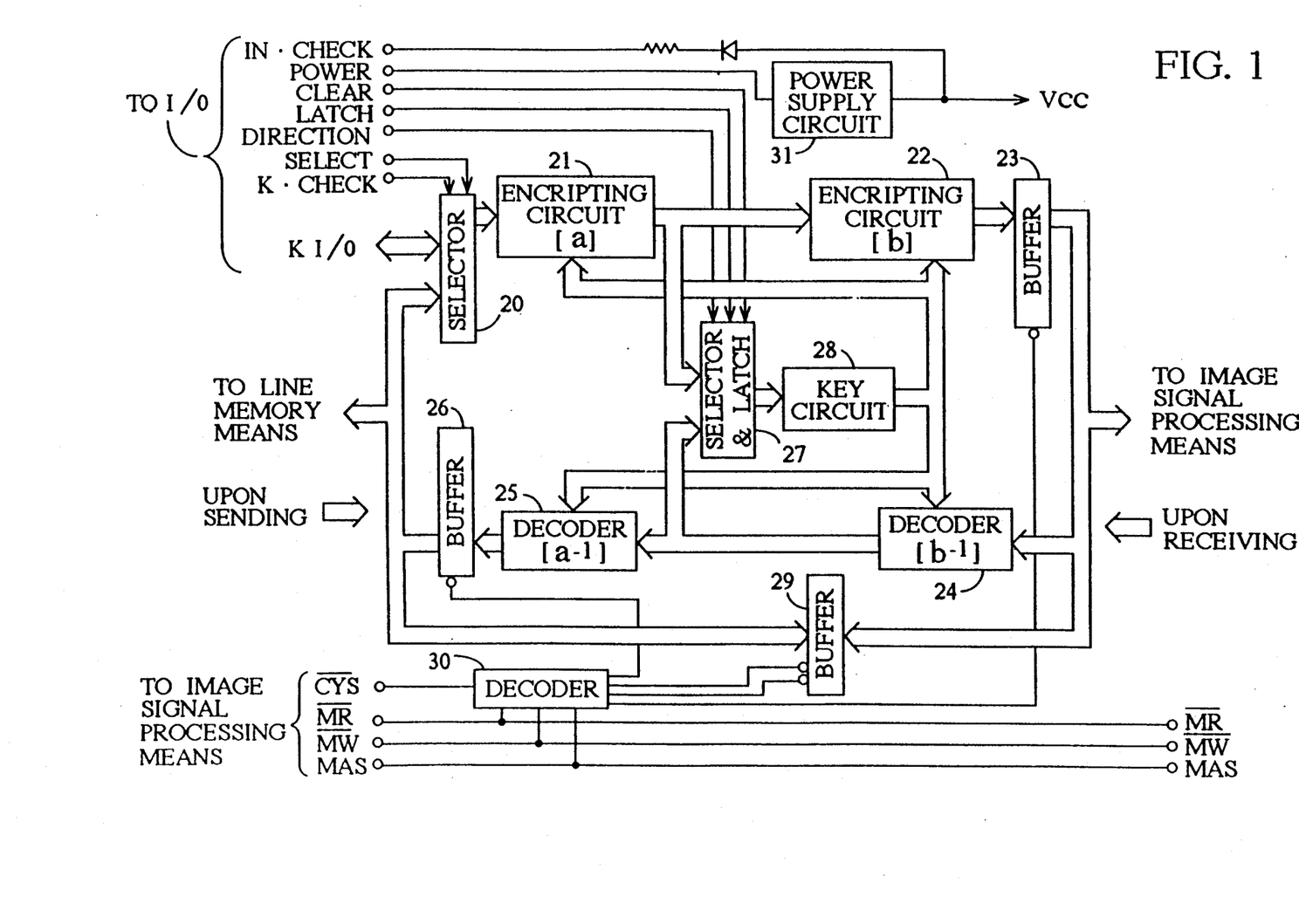
FIG. 1 is a circuit diagram of a data encripting transfer showing one embodiment of the present invention.

The signal encripting transfer means 8 will be explained. FIG. 1 is a circuit diagram of the signal encripting transfer means 8 showing one embodiment of the present invention.

Referring to FIG. 1, the signal flow from the line memory to the image signal processing shows a signal flow when an image signal is sent and the signal processing to the line memory shows a signal flow when an image signal is received.

Figure 3:
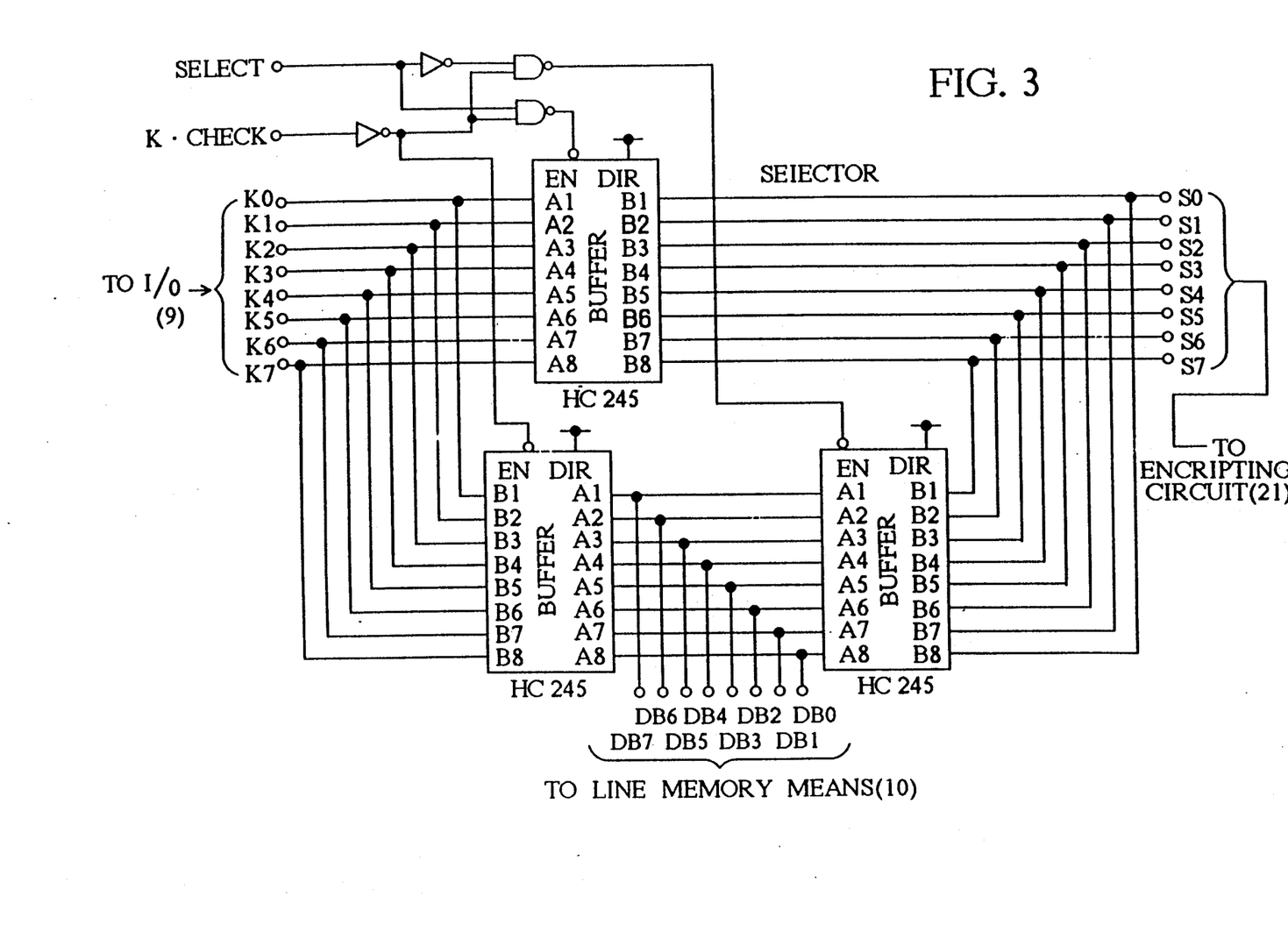
FIG. 3 is a circuit of the selector shown in FIG. 1.

Selector 20 comprises three buffers (HC245) as shown in FIG. 3, and changes the key control I/O 9 and the encripting circuit [a] 21. This change is controlled in response to select signal and key check signal.

Figure 4:
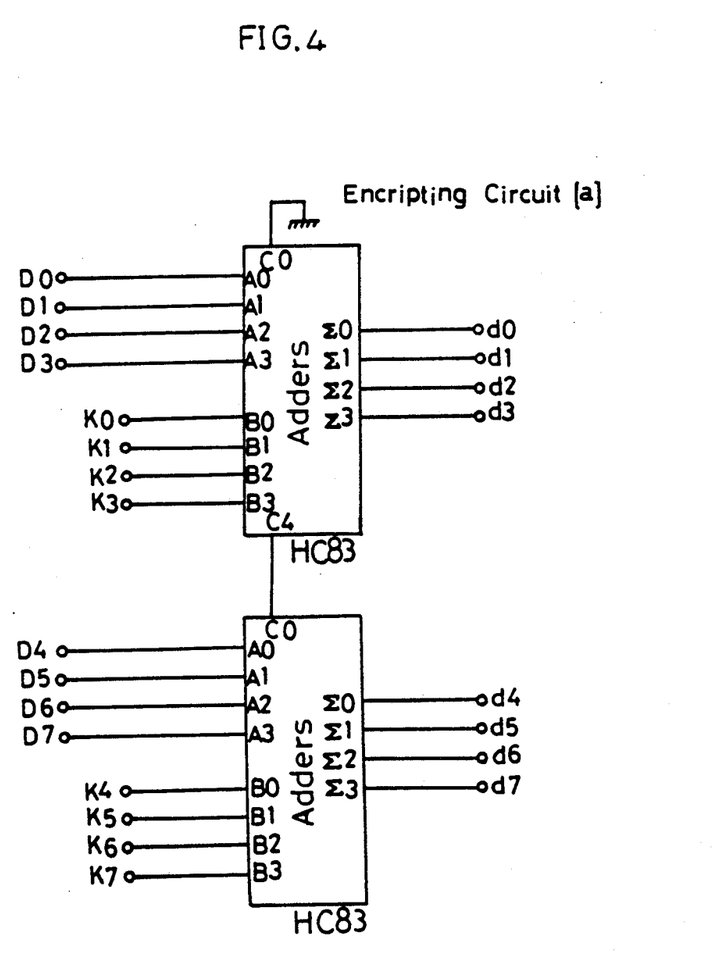
FIG. 4 is a circuit of the encripting circuit [a] shown in FIG. 1.
Figure 5:
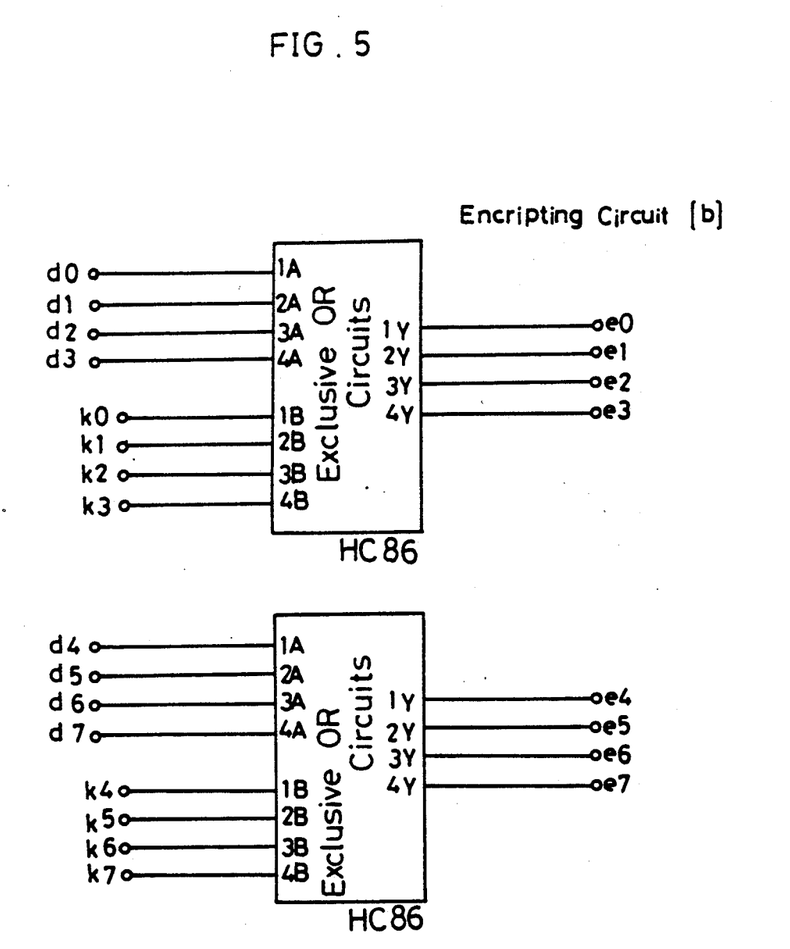
FIG. 5 is a circuit of the encripting circuit [b] shown in FIG. 1.

Encripting circuit [a] 21 comprises two adders (HC83) as shown in FIG. 4, and adds an 8-bit line image signal of the selector 20 to a key output signal. Encripting circuit [b] 22 comprises two exclusive OR circuits as shown in FIG. 5, and outputs an exclusive OR signal of a signal of the selector 20 or the key output signal.

Figure 6:
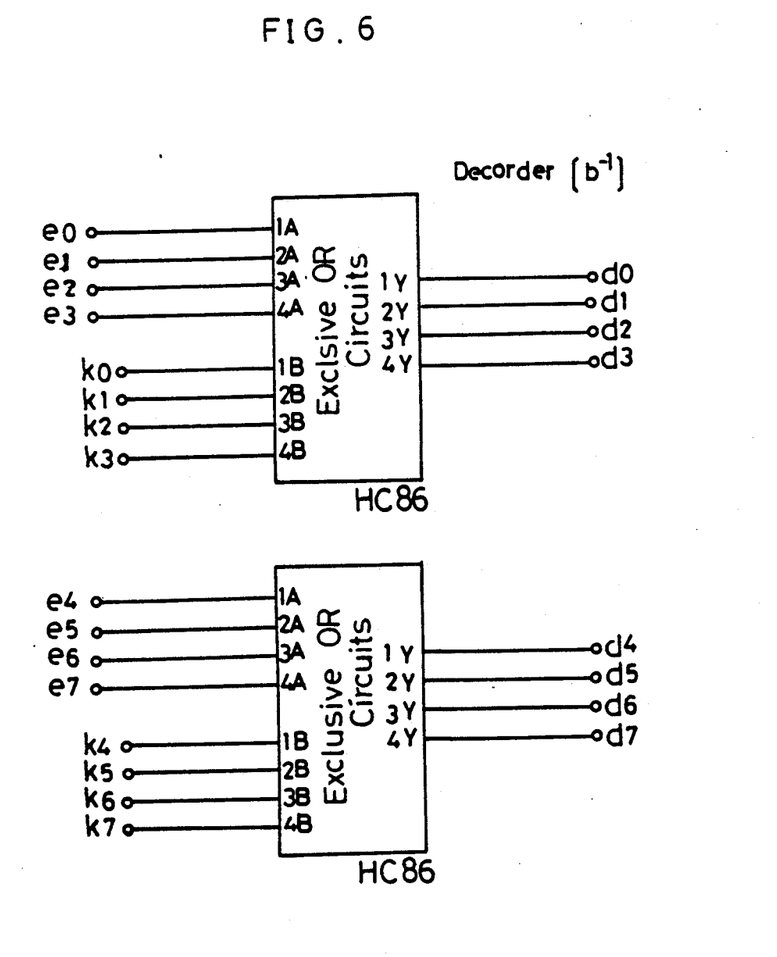
FIG. 6 is a circuit of the decoder [b$^{-1}$] shown in FIG. 1.
Figure 7:
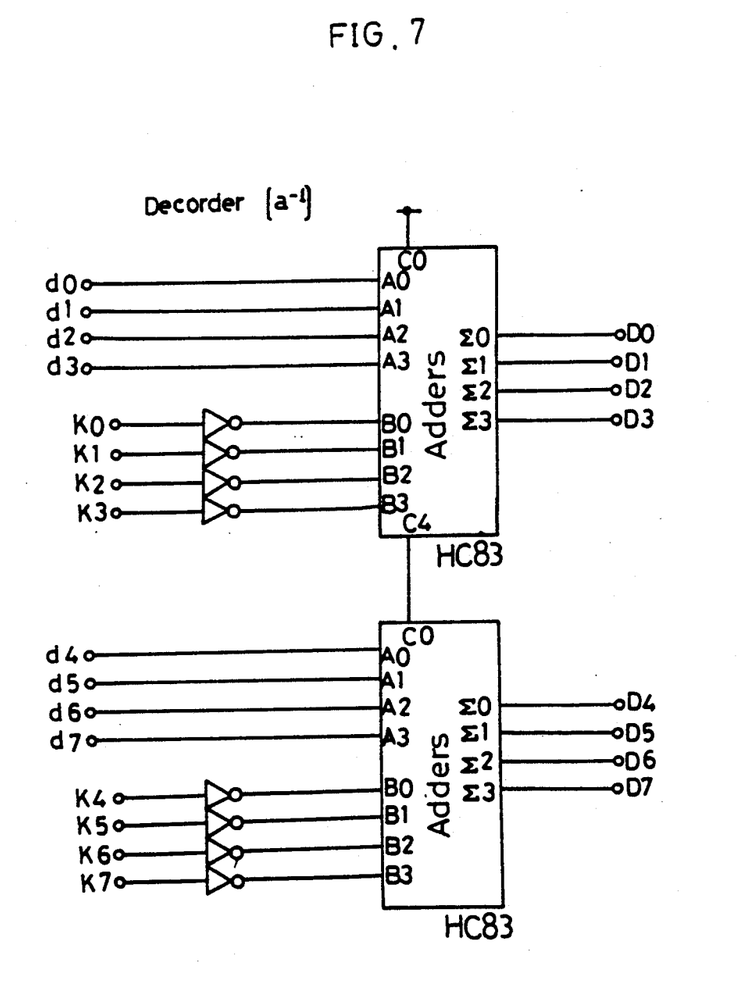
FIG. 7 is a circuit of the decoder [a$^{-1}$] shown in FIG. 1.

Decoder [b$^{-1}$] 24 comprises two exclusive OR circuits (HC86) as shown in FIG. 6, and outputs an exclusive OR signal of a signal of the image signal processing means 7 or a key output signal. Decoder ]a$^{-1}$] 25 comprises two adders (HC83) as shown in FIG. 7, and adds an exclusive OR signal of the decoder [b$^{-1}$] 24 to an inverted key output signal. Thus, the decoder [a$^{-1}$] 25 subtracts a key signal from an exclusive OR signal.

Figure 8:
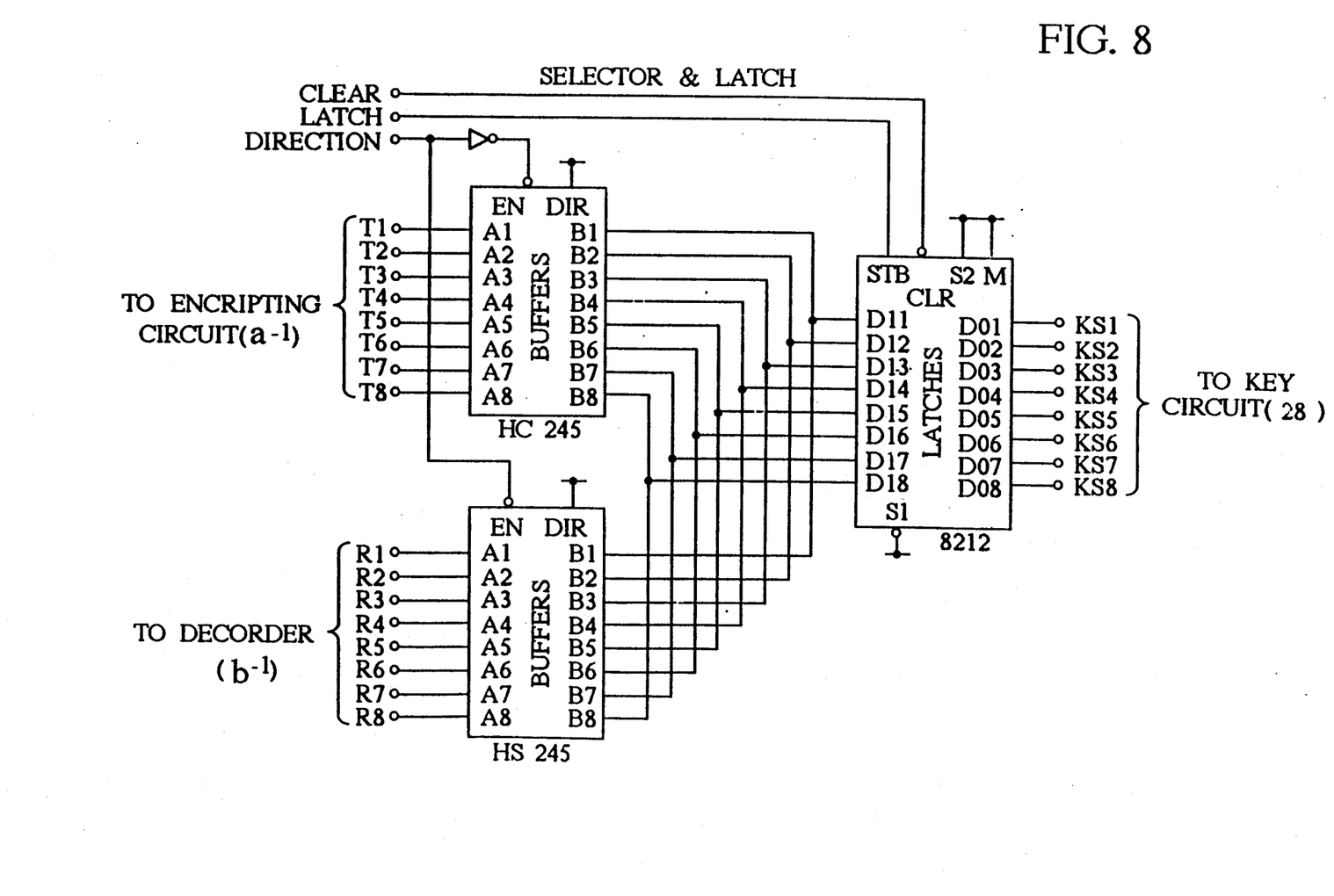
FIG. 8 is a circuit of the selector and latch shown in FIG. 1.

Selector and latch 27 comprises two buffers (HC245) and a latch (8212) as shown in FIG. 8, and selects an output signal of the encripting circuit [a$^{-1}$] 21 or an output signal of the decoder [b$^{-1}$] 24 and memorizes a selected signal in the latch (8212).

Figure 9:
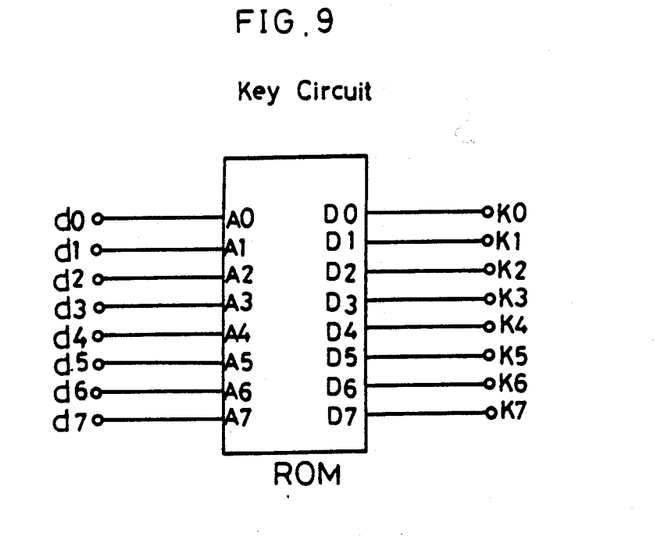
FIG. 9 is a circuit of the key setting circuit shown in FIG. 1.

Key circuit 28 comprises a ROM as shoWn in FIG. 9, and memorizes a predetermined key operation signal and outputs an 8-bit signal in response to an 8-bit signal input.

Figure 10:
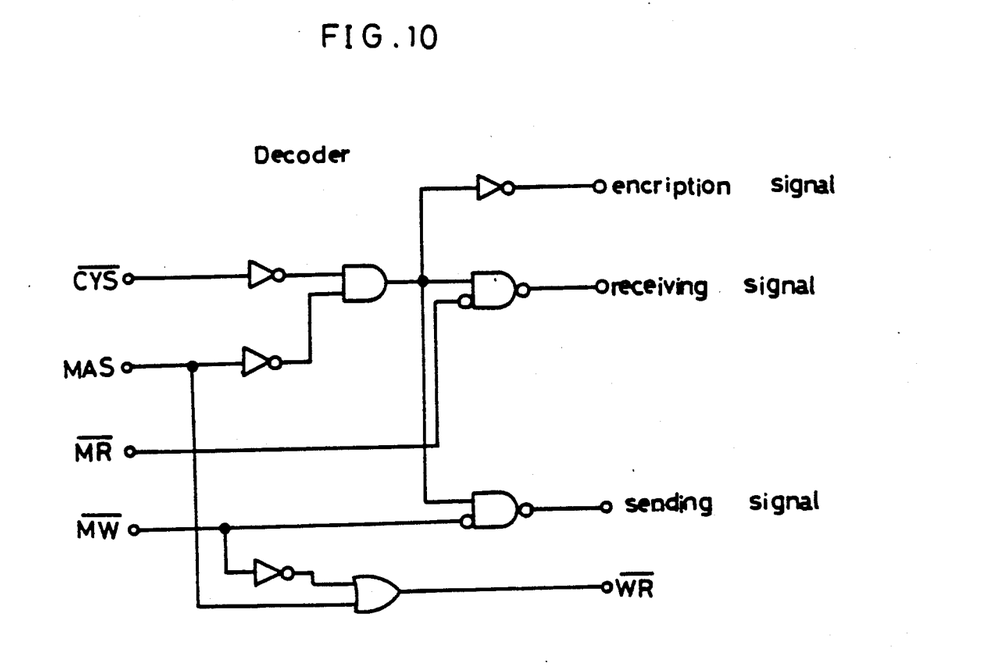
FIG. 10 is a circuit of the decoder shown in FIG. 1.

Decoder 30 comprises several gate circuits as shown in FIG. 10, and outputs an encription signal which shows whether a signal is encripted, receiving signal, sending signal and write/read signal in accordance with encripting signal CYS. memory read signal MR, memory write signal MW and memory address stroke signal MAS.

Figure 11:
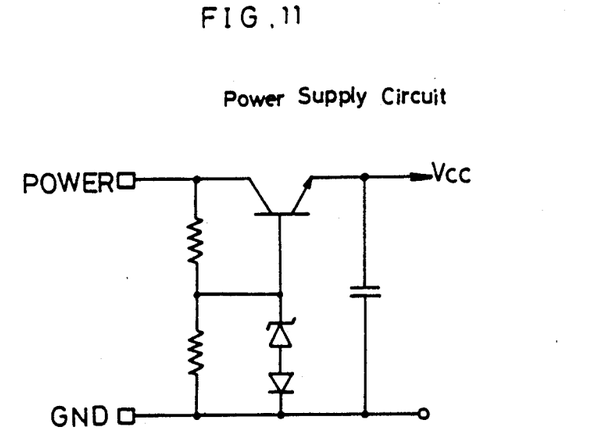
FIG. 11 is a circuit of the power supply shown in FIG. 1.

Power supply circuit 31 comprises a constant voltage circuit as shown in FIG. 11.

The buffers 23. 26 and 29 are used for changing the lines, and when the buffer 23 is closed only, the encripted image signal is transferred from the line memory 10 to the image signal processing means 7. When the buffer 26 is closed only, a decoded image signal is transferred from the image signal processing means 7 to the line memory 10. When the buffer 29 is closed only, a bypass circuit is connected which bypasses the encripting circuits [a] 21 and [b] 22 and the decoders [b$^{-1}$] 24 and [a$^{-1}$] 25.

Figure 12:
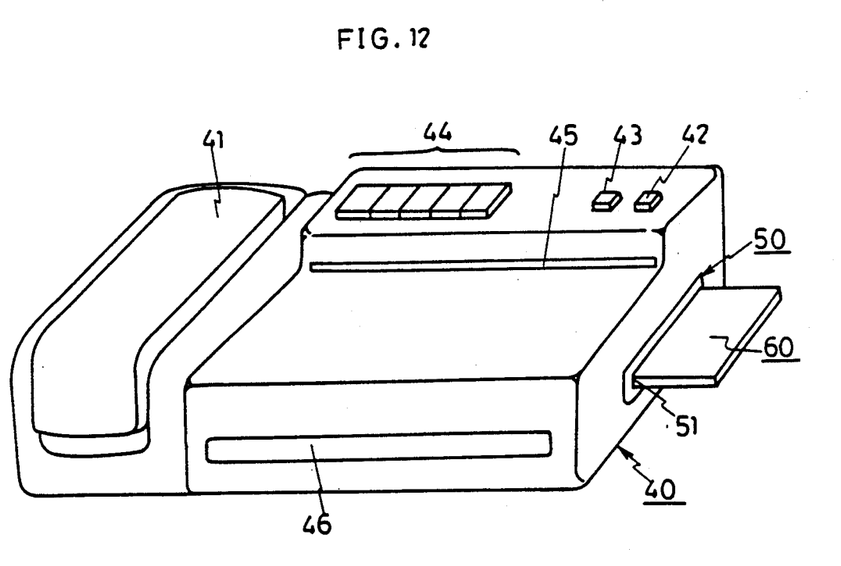
FIG. 12 is a view of a facsimile which uses the present invention.

One embodiment of a facsimile which uses a data encripting transfer of the present invention will be explained. FIG. 12 is a view of a facsimile showing one embodiment of the present invention.

Referring to FIG. 12, a facsimile 40 includes an image scanner means which scans a picture and converts an image into an electrical signal, a printer means which prints a received image signal and a feeder means which feeds a paper for printing and reporting. A telephone receiver 41 is provided for using a facsimile as a telephone. A switch 42 is for sending facsimile data which is encripted by a predetermined key. A display switch 43 is lit when a receiving signal is encripted and is used as a switch for cancelling to decode the encripted signal when the encription card 60 is inserted. Switches 44 are used for sending and receiving a facsimile. A paper which should be sent is inserted into a slit 45 and a paper which prints a received signal is fed out from a slit 46.

Figure 13:
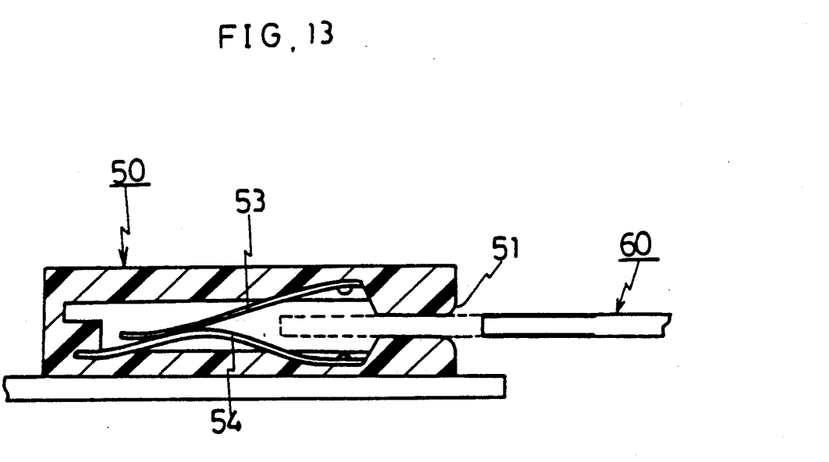
FIG. 13 is a cross sectional view of the card receiver of the present invention.
Figure 14:
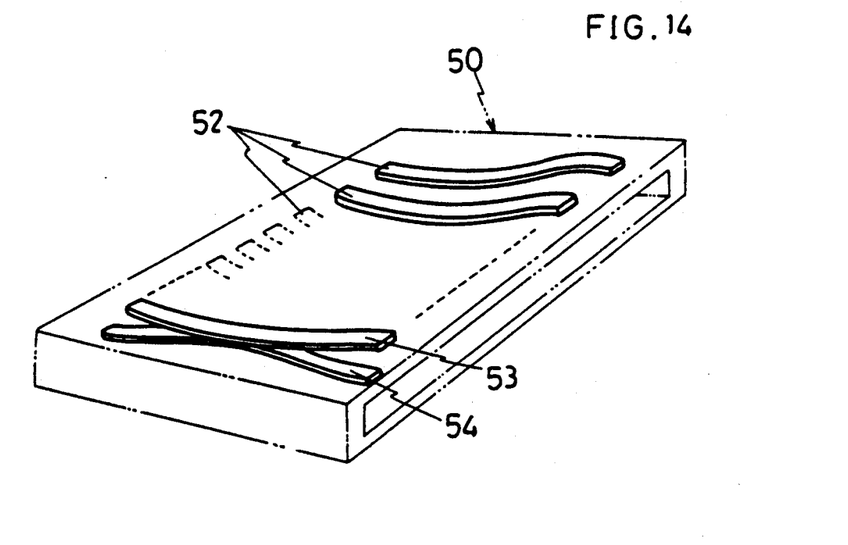
FIG. 14 is a schematic View of the connector of the present invention.
Figure 15:
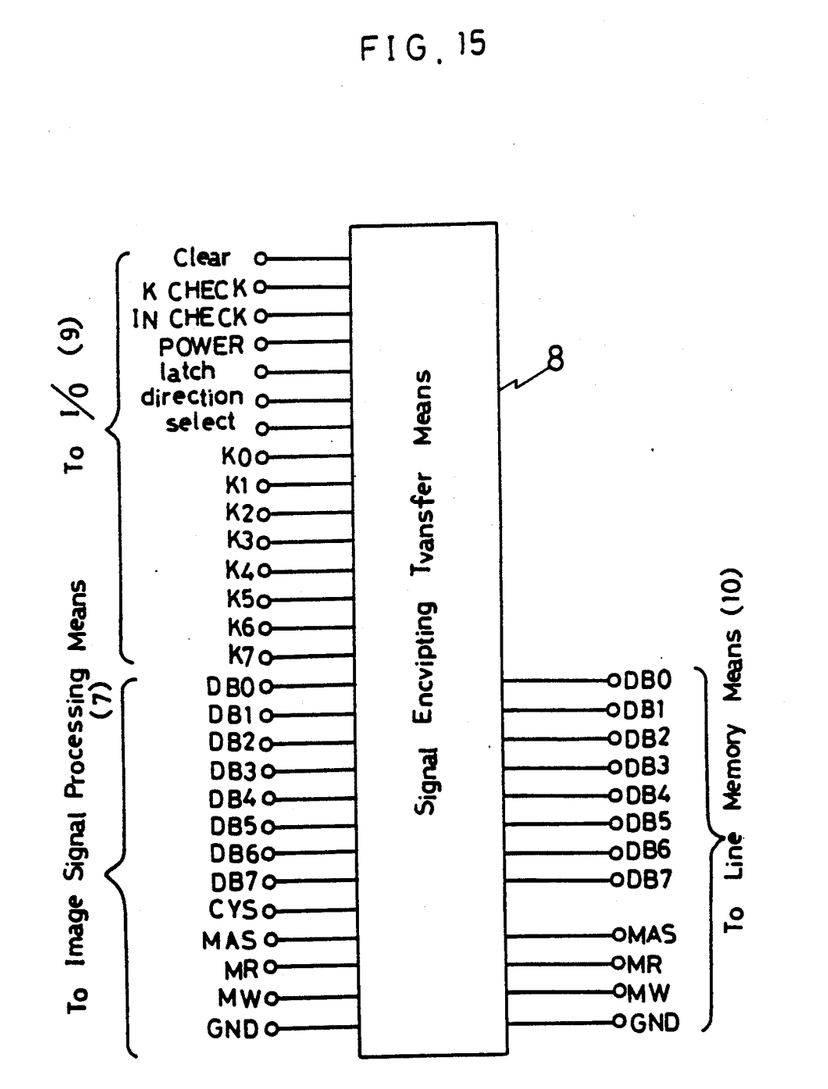
FIG. 15 is a circuit of the card of the present invention.

A card receiver 50 has a slit 51 in which the encription card 60 is inserted. FIG. 13 is a sectional view of the received card 50 and FIG. 14 is a view showing segments 52, 53 and 54 which comprises a connector. When the card 50 is inserted into the slit 51, the segments 52 contact the card 50 and connect to the circuit in the card 50. The segments 53 and 54 are opened when the card 60 is inserted. The segments 53 and 54 detect whether the card 50 is inserted. The card 60 includes the signal encripting transfer means 8 shown in FIG. 2, and has terminals which are connected to an I/O, an image signal processing circuit and a line memory.

Figure 16:
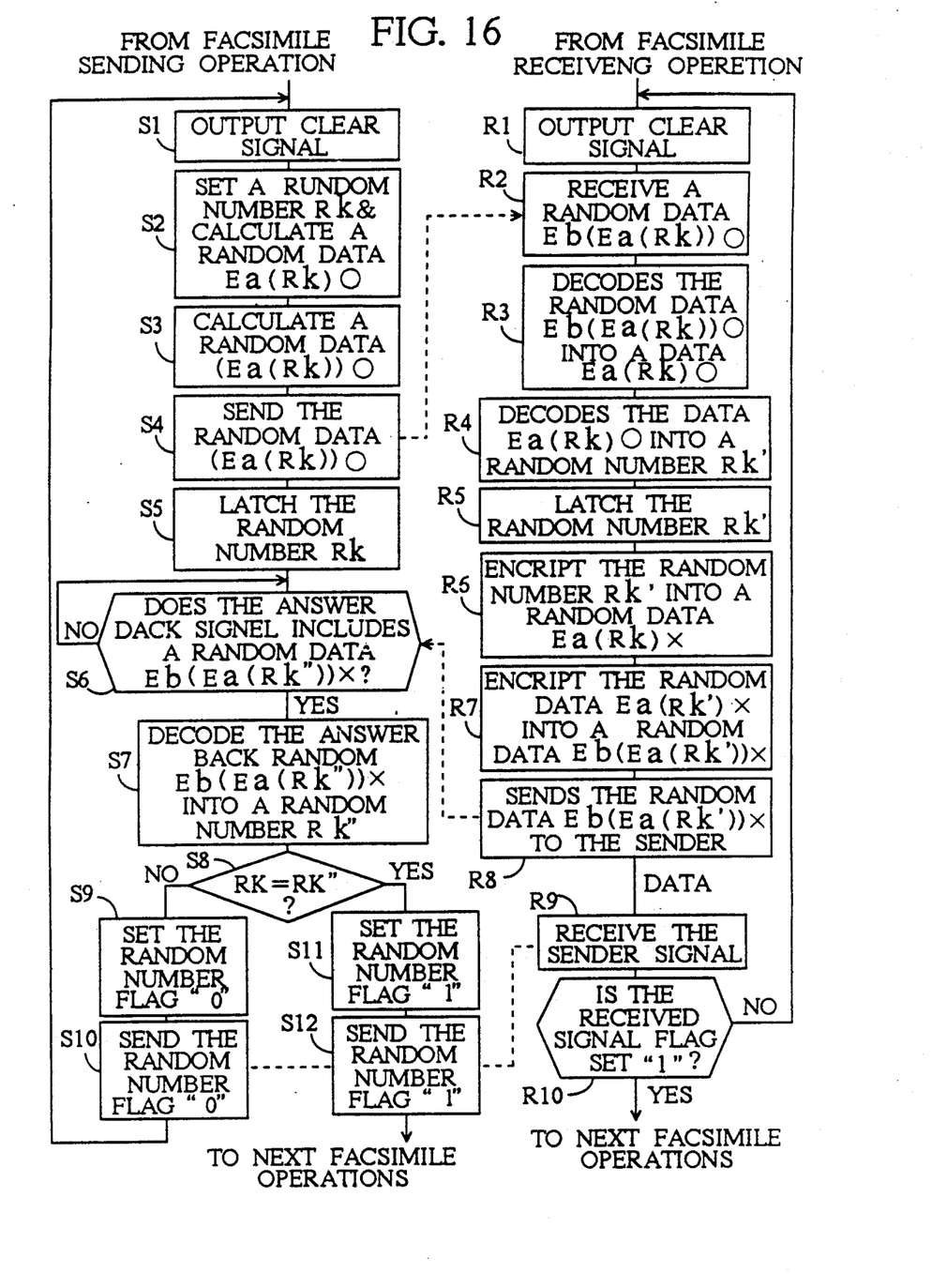
FIG. 16 is a flow chart showing an operation of the signal encripting transfer means shown in FIG. 15.

FIG. 16 is a flow chart which shows an operation of the signal encription transfer means 8 used for a facsimile. The control executes this operation in the beginning of the main program for the facsimile control. When the select switch 42 is off and the facsimile send process program is executing, the control bypasses the routine (steps S1-S12). When the select switch 42 is on, the routine is executed. In step 1, the control outputs a clear signal for initializing a key and for clearing the latch of the selector and latch 27. The control calculates a random data $Ea(RK)_O$ by setting the key circuit 28 to output a random number Rk and by using the encription circuit [a] 21 (step S2). In step 3, the control calculates a random data Eb $\{Ea(Rk)\}_o$ by the encripting circuit [b] 22. The control sends the encripted random data Eb $\{Ea(Rk)_o$ to the image signal processing means 7 through the buffer 23 (step 3), and latches the random number Rk in step 5. The control checks whether the answer back signal which is sent by the addressee includes a random data Eb $\{Ea(Rk'')\}x$ in step 6. The control decodes the answer back random data Eb $\{Ea(Rk'')\}x$ into a decoded random number Rk" by the decoders $[b^{-1}]$ 24 and $[a^{-1}]$ 25 in step 7. In step 8, the control judges whether the sent random number Rk is the received random number Rk". If the two random numbers are identical, then the control sets the random number flag "1" in step 11 and sends the acknowledgement signal (random number flag "1") to the addressee. Then the control goes to next facsimile operation. If the two random numbers are not identical, then the control sets the random number flag to "0" and sends the random number flag "0". Then the control goes to step 1 until the judgment is made that the two random numbers are identical in step 8.

When a signal is received, if the switch 42 is off, the control bypasses the routine (steps R1-R10) and executes the facsimile receiving operations. If the signal which shows the switch 42 of the sender is on (signal is encripted) is received, the control outputs the clear signal for initializing a key and for clearing the latch of the selector and latch 27. In step 2, a random data Eb-$\{Ea(Rk)\}_o$ is received. The control decodes the random data $Eb\{Ea(Rk)\}_o$ into a data $Ea(Rk)_o$ by the decoder $[b^{-1}]$ 24 *in step R3 and decodes the random data $Ea(Rk)_o$ into a* random number RK' by the decoder $[a^{-1}]$ 25 in step R4. The control latches the random number RK' in step R5. The control encripts the random number RK' into a random data $Ea(Rk')_x$ by the encripting circuit [a] 21 in step R6 and encripts the random data $Ea(Rk')_x$ into random data $Eb(Rk')_x$ by the encripting circuit [b] 22 in Step R7. The control sends the random data Eb-$\{Ea(Rk')\}_x$ to the sender. When the receiver receives the sender signal in Step R9, the control judges whether the received signal flag is "1" in Step R10. If the flag is not "1", the control goes back to Step R1 until the judgment is made that the flag is "1". If the flag is "1", the control sets the random number RK', as a key data of the receiver.

As explained above, the signal encripting transfer has the encripting circuits [a] 21 and [b] 22 which encripts the scanned image signal into the encripted signal in accordance with a random number Rk which is set by the key circuit 28, the decoders $[b^{-1}]$ 25 which decodes the encripted signal into an image signal in accordance with the random number Rk which is set by the key circuit 28, key data setting means which comprises the selector and latch 27 and the key circuit 28 which sets and sends a random number Rk as a key data, and the buffer 29 which can bypass the encripting circuits and decoders.

The key data setting means sends a random number Rk as a key data which is used for encripting an image signal to an addressee. Therefore, the sender can get a key data for decoding the encripted data of the addressee.

By having the buffer 29 which can bypass the encripting and decoding processing, the facsimile can send and receive non-encripted image signal.

The encription card includes the encripting and decoding circuits and the facsimile can operate the data encripting mode by inserting the card into the facsimile. Therefore, by changing the encription, it is easy to change into the encription mode. Thus, the encription card is one of the disable means because the encription mode is turned on and off by inserting the card.

What is claimed is:

1. A data encripting transfer system comprising:
   first transmitter/receiver means comprising first transmitting means for transmitting encrypted key data, encrypted image data and a flag signal, scanning means for scanning an object to output an image signal, a key circuit for setting key data, encrypting means for encrypting the key data, and for encrypting the image signal in accordance with the set key data; and
   second transmitter/receiver means comprising receiver means for receiving the encrypted key data, the encrypted image data and the flag signal transmitted by said first transmitter means, decoder means for decoding the received encrypted key data, thereby providing decoded key data, and for decoding the encrypted image signal;
   said second transmitter/receiver means further comprising means for encrypting the decoded key data, thereby providing answer back data, and second transmitter means for transmitting the answer back data to said first transmitter/receiver means; and
   said first transmitter/receiver means further comprising decoding means for decoding the answer back data transmitted by said second transmitter means, comparing means for comparing the decoded answer back data with the key data set by said key circuit, means for setting the flag signal in accordance with whether the comparison indicates that the decoded answer back data is coincident with the key data set by said key circuit, and the decoder means of said second transmitter/receive means being set in accordance with the decoded key data only if the flag signal transmitted by said first transmitter means indicates coincidence between the decoded answer back data and the key data set by said key circuit so that the decoder means of said second transmitter/receiver means decodes the encrypted image signal in accordance with the decoded key data.

2. The system defined in claim 1, wherein said encrypting means comprises a first encrypting circuit and a second encrypting circuit connected to receive an output of said first encrypting circuit.

3. The system defined in claim 1, wherein said decoding means comprises a first decoder circuit and a second decoder circuit connected to receive an output of said first decoder circuit.

4. The system defined in claim 2, wherein said decoding means comprises a first decoder circuit and a second decoder circuit connected to receive an output of said first decoder circuit, and wherein said first encrypting circuit provides a first encrypting function, said second encrypting circuit provides a second encrypting function, said first decoder circuit provides a first decoding function which is an inverse of the first encrypting function, and said second decoder circuit provides a second decoding function which is an inverse of the second encrypting function.

5. The system defined in claim 1, further comprising means for disabling said encrypting means so that said transmitter means transmits said image signal.

6. The system defined in claim 3, further comprising means for disabling said decoding means in response to disablement of said encrypting means.

7. The system defined in claim 1, further comprising card means containing said encrypting means, and card receiving means for receiving said card means, said encrypting means being enabled when said card receiving means receives said card means.

8. The system as defined in claim 1, further comprising card means containing said decoding means, and card receiving means for receiving said card means, said decoding means being enabled when said card receiving means receives said card means.

9. The system defined in claim 6, wherein said means for disabling said decoder means comprises a buffer directly connected to receive signals transmitted by said transmitter means.

* * * * *